United States Patent
Zhou

(10) Patent No.: US 8,697,597 B2
(45) Date of Patent: Apr. 15, 2014

(54) SELF SUSTAINED ELECTROCHEMICAL PROMOTION CATALYSTS

(75) Inventor: Xiangyang Zhou, Miami, FL (US)

(73) Assignee: University of Miami, Miami, FL (US)

(*) Notice: Subject to any disclaimer, the term of this patent is extended or adjusted under 35 U.S.C. 154(b) by 135 days.

(21) Appl. No.: 13/263,428

(22) PCT Filed: Apr. 6, 2010

(86) PCT No.: PCT/US2010/030052
§ 371 (c)(1),
(2), (4) Date: Oct. 7, 2011

(87) PCT Pub. No.: WO2010/117990
PCT Pub. Date: Oct. 14, 2010

(65) Prior Publication Data
US 2012/0027670 A1     Feb. 2, 2012

Related U.S. Application Data

(60) Provisional application No. 61/168,029, filed on Apr. 9, 2009.

(51) Int. Cl.
*B01J 23/83* (2006.01)
*B01J 23/02* (2006.01)
*B01J 23/22* (2006.01)
*B01J 23/28* (2006.01)
*B01J 21/10* (2006.01)

(52) U.S. Cl.
USPC ........... 502/303; 502/100; 502/151; 502/159; 502/182; 502/300; 502/302; 502/318; 502/321; 502/324; 502/325; 502/337; 502/338; 502/340; 502/343; 502/345; 502/350; 502/353; 502/355; 423/651

(58) Field of Classification Search
USPC ......... 502/100, 151, 159, 182, 300, 302, 303, 502/318, 321, 340, 343, 345, 350, 353, 502/355; 423/651
See application file for complete search history.

(56) References Cited

U.S. PATENT DOCUMENTS

| | | | |
|---|---|---|---|
| 3,540,868 A | 11/1970 | Chevion et al. | |
| 4,863,712 A | 9/1989 | Twigg et al. | |
| 5,108,850 A | 4/1992 | Carlson et al. | |
| 6,551,657 B1 * | 4/2003 | Clough | 427/217 |
| 6,936,366 B2 | 8/2005 | Kearl et al. | |

(Continued)

FOREIGN PATENT DOCUMENTS

| | | |
|---|---|---|
| JP | 06-223848 A1 | 8/1994 |
| KR | 10-1995-0031230 A1 | 12/1995 |
| KR | 10-2006-0069243 A1 | 6/2006 |
| KR | 10-2007-0043829 A1 | 4/2007 |

OTHER PUBLICATIONS

International Search Report and Written Opinion dated Nov. 22, 2010 for International Application Serial No. PCT/US2010/030052, International Filing Date: Apr. 6, 2010 consisting of 11 pages.

*Primary Examiner* — Jun Li
(74) *Attorney, Agent, or Firm* — Christopher & Weisberg, P.A.

(57) ABSTRACT

A method and system for the reduction of pollutant NOx gases from automobile exhaust, as well as a method of reforming hydrocarbons, using a self-sustaining catalyst comprising an ion conductive support, a dispersed cathodic phase, a dispersed anodic phase, and a dispersed sacrificial phase, and a method of forming the self-sustaining catalyst.

6 Claims, 2 Drawing Sheets

(56) References Cited

U.S. PATENT DOCUMENTS

| | | |
|---|---|---|
| 7,320,298 B1 | 1/2008 | Ahern |
| 7,410,717 B2 | 8/2008 | Moon et al. |
| 7,595,127 B2 | 9/2009 | Seabaugh et al. |
| 7,615,293 B2 | 11/2009 | Farneth et al. |
| 7,625,642 B2 * | 12/2009 | Matsutani et al. ............ 428/704 |
| 2003/0096880 A1 * | 5/2003 | Wang et al. ................... 518/714 |
| 2004/0086441 A1 * | 5/2004 | Hori et al. .................. 423/213.5 |
| 2005/0053819 A1 | 3/2005 | Paz |
| 2006/0075743 A1 * | 4/2006 | Li et al. ........................... 60/286 |
| 2006/0081922 A1 * | 4/2006 | Golden ........................ 257/335 |
| 2008/0233039 A1 * | 9/2008 | Hagemeyer et al. .......... 423/351 |
| 2009/0214919 A1 * | 8/2009 | Suzuki et al. ................... 429/31 |

* cited by examiner

SELF SUSTAINED ELECTROCHEMICAL PROMOTION CATALYSTS

CROSS-REFERENCE TO RELATED APPLICATIONS

This application is a Submission Under 35 U.S.C. §371 for U.S. National Stage Patent Application of International Application Number: PCT/US2010/030052, filed Apr. 06, 2010, entitled "SELF SUSTAINED ELECTROCHEMICAL PROMOTION CATALYSTS" which claims priority to U.S. Provisional Application Ser. No: 61/168,029,filed Apr. 09, 2009, the entirety of both which are incorporated herein by reference.

FIELD OF THE INVENTION

This invention relates to a catalyst having a self sustained electrochemical method of promotion, and particularly to a system and method for a catalyst having a self sustained non-Faradaic electrochemical modification of catalytic activity using a sacrificial phase to provide stable electrical flow from the cathodic catalyst to the anodic catalyst.

BACKGROUND OF THE INVENTION

The desire to reduce our dependence on foreign oil and to reduce pollution has lead to the pursuit of several cleaner energy production technologies. Fuel cells produce electricity more efficiently and more cleanly than existing hydrocarbon fueled energy production methods that use simple combustion. Before optimum commercialization of fuel cells may be realized, they must achieve a higher level of performance. Goals identified for a commercial fuel cell include high specific power (>1.0 kW/kg), high energy efficiency (40-60%), low cost (<$200/kW), fast response, high durability (>5000 hrs), and good fuel flexibility.

It has been contemplated that in the future fuel cells may run primarily on hydrogen produced from reforming renewable biofuels. However, in order to effect timely commercialization of fuel cells and facilitate a transition from existing fossil fuels to biofuels and their derivatives, fuel cells must be capable of consuming more traditional hydrocarbons found in fossil fuels, for example natural gas, liquid petroleum gas, petroleum, and other hydrocarbons. Most existing fuel cells, however, operate most efficiently when consuming syngas, i.e. a combination of mainly hydrogen, carbon monoxide and some carbon dioxide. Thus, long chain and other hydrocarbons found in fossil fuels, e.g. petroleum, must be reformed into syngas before they may be efficiently used as fuel in a fuel cell.

Solid oxide fuel cells (SOFCs), and particularly low temperature SOFCs operating at 450-650° C., are particularly attractive possible fuel cell designs for generating electricity. A lower operating temperature requires less complexity in design and fabrication, enhanced flexibility in materials selection, enhanced reliability and durability, less insulation, higher thermal efficiency, and reduced stack volume and mass. However, development of a compatible reformer operating at lower temperatures for high hydrocarbon fuels proves to be a very challenging task.

Two reforming schemes have been implemented in SOFC systems: external reforming and internal reforming (IR). In the case of internal reforming, the reformation of the hydrocarbon fuels takes place in the SOFC anode reaction chamber. The scheme of internal reforming is further categorized into indirect internal reforming (IIR) when the reforming reactions are separated spatially from the electrochemical reactions and direct internal reforming (DIR) when the reforming reactions take place on SOFC anode. Use of an IR schemes eliminates the external reformer as a subsystem, reduces the total size and mass, facilitates heat transfer, and enhances the thermal efficiency.

The reforming reaction, while thermodynamically favored, is inherently slow, and non-selective for the desired products. Various catalysts have been developed, but are still insufficient to reform hydrocarbons at the speed and temperature desired for SOFCs.

Enhancement of intrinsic catalytic activity requires improvement of the catalyst material itself. Most catalysts have three components: an active phase, a promoter and a support. Precious metals or alloys are commonly used as active phases. Ni and Ni alloys may be used as non-precious metal active phases. However, they require both a high operating temperature and small quantities of precious metals to reduce coking. Most of existing methods of reforming require high temperatures (>700° C.) and a large amount of oxygen or steam.

Common catalyst supports such as alumina provide a catalyst carrier that prevents sintering or ripening of the active phases and ensures a stable active surface. More recently, oxygen ion conducting materials, such as ceria and zirconia, have been used as catalyst supports. Catalysts on non-stoichiometric ceria exhibit increased oxidation catalysis due to a metal-support interaction. The ceria support material provides a stable surface for oxygen species in the oxidation reaction. Consumed oxygen in the ceria lattice is replaced by transported of oxygen ions from oxidizing molecules to the lattice. The reforming reaction typically involves at least two reactant molecules and takes place at active sites on the catalyst only a few nanometers wide.

Electrochemical promotion of catalysis in the solid-state electrochemical systems with an external power source can accelerate reaction kinetics remarkably at temperatures as low as 350° C. Electrochemical promotion is functionally identical to classical promotion; i.e., it is catalysis in the presence of a controllable electric double layer at the metal/gas interface. The mechanism of electrochemical promotion is thought be due mainly to production of short-lived sacrificial promoters, such as $O_2^-$, $O_2^{2-}$, $O^-$, or most likely $O^{2-}$, which are continuously supplied to the catalyst/gas interface via electrochemically controlled transport including surface diffusion from the solid electrolyte support. It is also called non-Faradaic electrochemical modification of catalytic activity (NEMCA). The rate enhancement ratio is defined by $$\rho = \frac{r}{r_0} \quad (1)$$

and the enhancement factor (electrochemical promotion efficiency) by $$\lambda = \frac{r - r_0}{\frac{I}{2F}} \quad (2)$$

It has been demonstrated that the electrochemical promotion of catalytic reforming can increase promotion efficiency be more than 2 orders of magnitude, $\lambda \gg 1$, even at very low current density (~1 mA cm$^{-2}$). Unfortunately, the electrochemical promotion can only be enabled via an external power source or short-circuiting the anode and cathode of an electrochemical cell, which is equivalent to a single-chamber solid oxide fuel cell (SC-SOFC). This is neither realistic nor easy to accomplish.

It is also desirable to minimize the production of nitrogen oxides (NOx) during combustion or other energy production using fossil fuels. Electrochemical promotion can accelerate nitrogen oxide reduction in the presence of a reducing agent and oxygen by several orders of magnitude ($\times 10^4$) even at a low current density, such as about 5 mA/cm$^2$ and at low temperatures such as about 300° C. to about 650° C., but this requires use of precious metal catalysts. Precious metals have also consistently been required in order to prevent coking of the catalyst material.

It is therefore desirable to provide a system and method for reforming fossil fuels into syngas usable by a low temperature solid oxide fuel cell. It is also desirable to provide a strong catalyst for hydrocarbon reforming that does not require an external source of electric current. It is also desirable to provide a system and method for catalyzing the reforming fossil fuels into compound usable by a solid oxide fuel cell at a low temperature without an external electric current supply or high pressure oxygen or steam. It is also desirable to provide a system and method for reforming fossil fuels that minimizes the production of nitrogen oxides and minimizes coking of the catalyst.

SUMMARY OF THE INVENTION

The present invention advantageously provides a method and system for the reduction of pollutant NOx gases from automobile exhaust using a self-sustaining catalyst comprising an ion conductive support, a dispersed cathodic phase, a dispersed anodic phase, and a dispersed sacrificial phase.

The present invention also provides a method for forming a self-sustaining electrochemical promotion catalyst comprising mixing an oxygen ion conducting material, a cathodic material, graphite powder, and poly(styrene-divinylbenzene) into a slurry, drying the slurry, firing the slurry at about 1100° C. into a solid, milling the solid into a powder, impregnating the solid with nickel nitrate, copper nitrate and ceria nitrate and reducing the powder with hydrogen at about 500° C.

The present invention further provides a method of reforming hydrocarbons comprising providing a catalytic support capable of conducting oxygen ions, applying discrete particles of an oxidizing phase, discrete particles of a reducing phase and discrete particles of an electron carrier to a surface of the catalytic support, and passing a hydrocarbon mixed with air over the catalytic support at a temperature between 450° and 650° Celsius.

Other advantages of the invention will be apparent from the following disclosure.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

In accordance with certain of its aspects this invention relates to a self sustained electrochemical promotion catalyst (SSEP catalyst) stabilized by a sacrificial phase. The catalyst selectively oxidizes hydrocarbons into syngas, prevents coking of the reactive bed, and reduces nitrous oxides. The SSEP catalyst requires no external current or steam and may sustain a temperature of 450-650° C.

Figure 1:
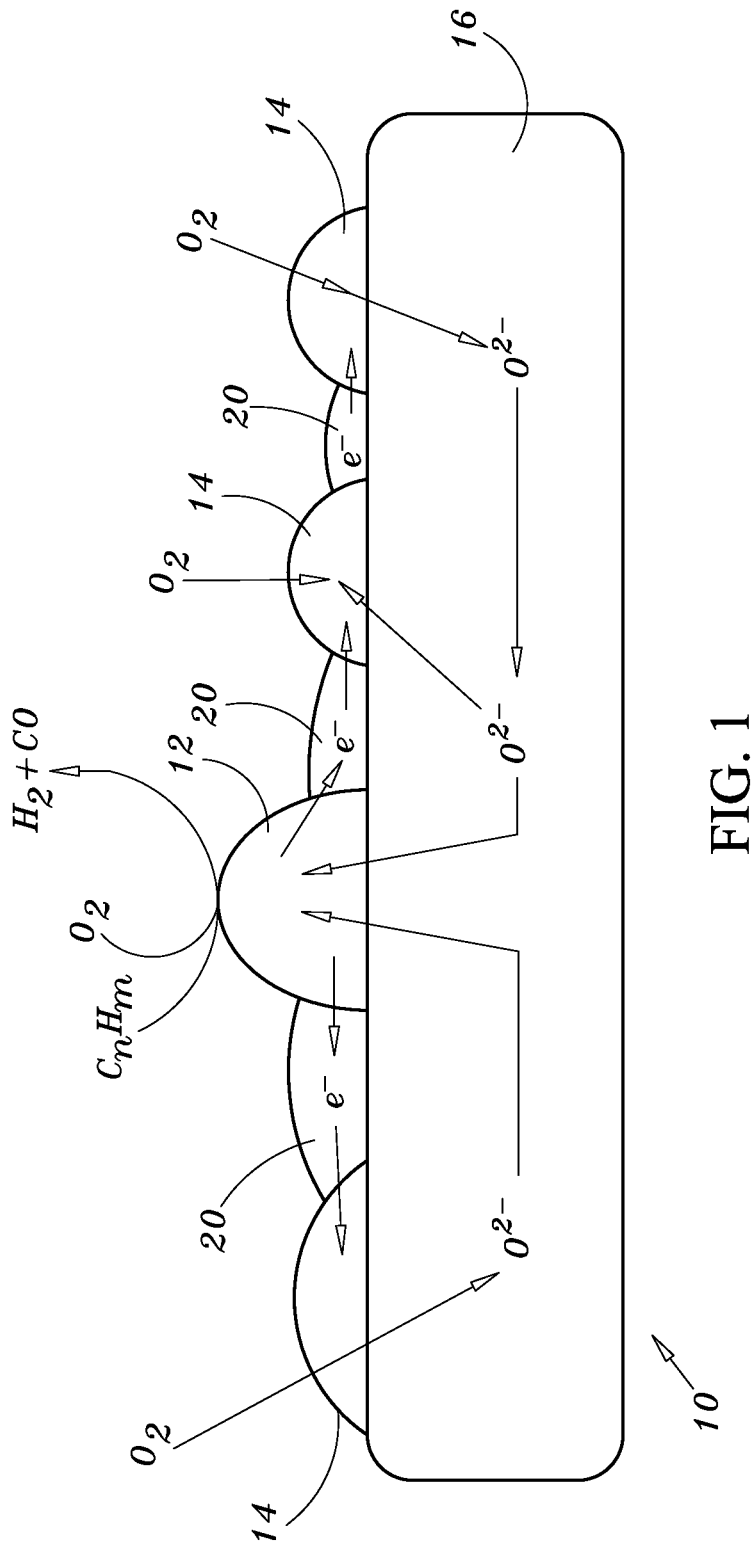
FIG. 1 is a diagram of a self sustained electrochemical promotion catalyst.

Referring now to the drawing figures in which like reference designators refer to like elements, there is shown in FIG. 1 a diagram of an embodiment of a self-sustaining electrochemical promotion catalyst constructed in accordance with principles of the present invention and generally designated as "10." The SSEP catalyst includes an anodic phase (or oxidizing phase) 12, a cathodic phase (or reducing phase) 14, an O$^{2-}$ ion conductive support 16, and a sacrificial phase 20. Unlike other electrochemical promotion devices with a separated anode and cathode, the SSEP catalyst may contain several dispersed micro- or nano-scale anodes 12 and cathodes 14 in the form of fine particles, typically 20 nm-0.5 µm. in diameter.

Without being bound by theory, it is believed that the difference in electrochemical potential between the selective anodic phase 12 and the selective cathodic phase 14 causes the oxygen ion species (O$_2^-$, O$_2^{2-}$, O$^-$, O$^{2-}$, in general, O$^{\delta-}$) produced at the cathodic phase 14 to be driven to the anodic phase 12 through the oxygen ion conductive support 16 and participate in the oxidation of hydrocarbons. The electrons resulting from the oxidation reactions are then driven to the cathodic phase 14 through the electrically conductive phase 20 and participate in reduction reactions. Thus, the SSEP catalyst effects a non-Faradaic electrochemical promotion, i.e. a NEMCA effect, without an external power supply. Distances from about 20 nm to about 20 µm between the anodic phases 12 and cathodic phases 14 allow efficient transfer of electrons and oxygen ions and enables effective coupling between the half-cell electrochemical reactions. Without being bound by theory, the reactions believed to be taking place at the anode include:

If there is oxygen and hydrocarbon fuel:

$$C_nH_m + \tfrac{1}{2}nO_2 = nCO + \tfrac{1}{2}m\,H_2 \tag{3}$$

This reaction is promoted by O$^{2-}$ but does not consume O$^{2-}$; and $$H_2 + O^{2-} \text{ (from the the solid ion conductor)} = H_2O + 2e^- \tag{4}$$

If there is carbon deposition on the anode:

$$C + 2O^{2-} \text{ (from the electrolyte)} = CO_2; \text{ or} \tag{5}$$

$$C + O^{2-} \text{ (from the electrolyte)} = CO \tag{6}$$

The carbon deposition may thus be removed. This may prevent coking of the SSEP catalyst.

The reactions believed to be taking place at the cathode include:

$$O_2 + 4e^- = 2O^{2-} \text{ (into the electrolyte)} \tag{7}$$

If there less O$_2$ but some NO$_x$:

$$NO_x + e^- = N_2 + \tfrac{1}{2}xO^{2-} \text{ (into the electrolyte)} \tag{8}$$

So, when there is NOx, it may produce promoters O$^{2-}$ for hydrocarbon reforming while itself may be reduced into non-toxic N$_2$.

The sacrificial phase may undergo:

$$ZnO + e^- = Zn + O^{2-} \tag{9}$$

If the anodic reaction is prevailing, there may be more electrons than O$^{2-}$, and the reaction may proceed to the right with consumption of ZnO. If the cathodic reaction is prevailing, the reaction may proceed to the left with consumption of Zn. However, as long as there is ZnO and Zn, the potential may stabilized and at an appropriate potential for reduction of NOx and reforming of hydrocarbon. In this manner, the sacrificial phase may stabilize the electrochemical potential, acting as a type of "redox buffer." Just as a pH buffer, such as bicarbonate, may stabilize the pH of an aqueous solution, the sacrificial phase may maintain a relatively stable redox potential and may sustain the NEMCA effect. In this example zinc and zinc oxide are used by way of example and other materials as explained herein may be used in the sacrificial phase to modulate the redox reactions of the SSEP catalyst.

Without being bound by theory, it is believed that use of an ion conducting catalytic support instead of an insulating support, e.g. $Al_2O_3$, facilitates coupling of the two half reactions at separate locations may be equivalent to increasing the probability with which the reacting molecules meet at an active site. In the case where a small region of anodic material is coupled with a large region of cathodic material, the oxidation at the anodic region may be further accelerated. The intimate contact between the functional phases (anodic, cathodic, electrically conductive, and the ion conductive support) may enable additional enhancement via concerted interfacial effects.

The surface area of the SSEP catalyst may be about 1 $m^2/g$ to about 1000 $m^2/g$ and the pore sizes may range from about 5 nm to about 0.5 μm. The SSEP reforms fossil fuels such as for example diesel, gasoline, methane, kerosene, and other hydrocarbons, from short chain hydrocarbons such as propane to long chain hydrocarbons such as pentadecane, as well as aromatic and other structured hydrocarbons. Optionally, the SSEP catalyst may catalyze other partial oxidation reactions or may optionally more fully oxidize hydrocarbons.

The dispersed cathodic phase 14 may be a perovskite oxide having crystal structure similar to calcium titanium oxide and may include for example $LaSrFeO_3$, $LaCoFeO_3$, $LaSrMnO_3$, $LaSrTiO_3$, $SmSrMnO_3$, and $SmCuMnO_3$. The reducing phases typically account for about 10% by weight to about 70% by weight of the catalyst system. Gold and other precious metals are also suitable materials for use as the cathodic phase. However, unlike other catalysts, a precious metal is not necessary and less expensive perovskites may be used.

The dispersed anodic phase 12 may be transition metals or transition metal oxides such as for example the metals Ni, V, Cu, Fe, and Co and their oxides. Perovskite oxides such as for example $((La_{0.75}Be_{0.25})_{0.9}Cr_{0.5}Mn_{0.5}O_3)$, may also be used as the reducing catalyst. Perovskite oxides can function as either the cathodic or anodic phases. Perovskites may optionally be used as both the anodic phase and the cathodic phase catalyst so long as the oxidation potential of the anodic phase is greater than the oxidation potential of the cathodic phase. The anodic phase typically accounts for about 10% by weight to about 70% by weight of the system. Pt, Rd, Rh, Ru, Pd, and Ir and other precious metals are also suitable materials for use as the anodic phase. However, unlike other catalysts, a precious metal is not necessary and the above less expensive materials may be used.

The support 16 conducts oxygen ions, including $O^{2-}$. The ion conductor in the support may be an electrolyte, for example, a solid state electrolyte such as a stabilized or doped metal oxide. The stabilizing or doping metal may be from Periods 4, 5 and 6 of the Periodic Table, transition metals, rare earth or Group 14 metals. Among these stabilized or doped metal oxides are yttira (yttrium oxide)-stabilized zirconia (YSZ), yttira doped ceria (cerium oxide), Yttrium doped bismuth oxide, Gadolinium doped ceria, Gadolinium doped Bismuth oxide, Samarium doped ceria, Samarium doped Bismuth oxide, Germanium doped ceria and Germanium doped Bismuth oxide. Yttrium (Y) is a Period 5 transition metal; Gadolinium (Gd) and Samarium (Sm) are Period 6 rare earth (lanthanoid) metals; Germanium (Ge) is a Period 4, Group 14 metal. The electrolyte may account for about 10% by weight to about 50% by weight of the catalyst system. The support also optionally includes other support materials that may facilitate a formation of a high surface area support including pores or other structures. For example, graphite may be used in the support.

The sacrificial phase may be a Group IIA metal and/or oxide thereof, for example, Mg, Ca, Sr or Ba or their oxides and may also be transition metals or their oxides or Al and its oxide. Examples include Zn, Mn, Ti, Mo, Cu, Mg, Ce and Al and their alloys, a Zn/Mg/Cu alloy, a Zn/Ti/Cu alloy, a Mn/Ti/Zn alloy and a Mn/Mo/Cu alloys. The stabilizing phase typically accounts for about 5% by weight to about 15% by weight of the catalyst system. The sacrificial phase may include both a conducting material and a material that may be reversibly oxidized, for example zinc. The reversibly oxidizable component may be reduced during combustion or reforming under low oxygen conditions and its presence provides a current for stabilizing the electric potential at a high and desirable level of about −0.5 volt to about +0.5 volt and thereby avoids the need to provide an external power source. The sacrificial phase may be a material that also functions as a good electronic conductor.

This combination of dispersed oxidizing phase, reducing phase, oxygen ion conducting phase, and stabilizing phase enable a very high catalytic activity superior to precious metal catalysts and avoid using an external power. As the fuel is reformed the temperature may be about 300° C. to about 650° C.

An illustrative example of a SSEP catalyst system comprises:

An illustrative example of a preferred catalyst system comprises:

| Chemical Formula | Use | Wt % |
|---|---|---|
| $La_{0.7}Sr_{0.3}Cu_{0.1}Mn_{0.9}O_3$-d | Cathodic Phase | 50 |
| $(La_{0.75}Be_{0.25})_{0.9}Cr_{0.5}Mn_{0.5}O_3$-d | Anodic Phase | 30 |
| $Zr_2O_3/Y_2O_3/CeO_2$ | in a ratio of 2:1:8 oxide as the oxygen ion conductor | 10 |
| Zn/Mg/Cu | in a ratio of 8:2:8 as the stabilizing phase | 10 |

Where d is a fraction of a unit, usually less than 0.2. That is, there are vacancies in the microstructure facilitating conduction.

A SSEP catalyst in accordance with the present invention may be synthesized by the following procedure: first, yttria-stabilized zirconia (YSZ), an ionic conductor, is mixed with (LaSr)$MnO_3$ (LSM), poly(styrene-divinylbenzene) (2% cross-linked), graphite powder, and binder in water. The slurry is dried in an oven and then fired in a furnace at about 1100° C. This forms the support with YSZ, the $O^{2-}$ conductor, and LSM, the cathodic phase 14. Uniform distribution of the YSZ support and the LSM cathodic phase 14 provides short electrical circuits and better coupling between the anodic and cathodic reactions. The solid then is milled and impregnated with the stabilizing phase made of equal parts Ni, Cu, and Ce nitrates. This slurry then is dried in an oven at about 150° C. Finally, the solid is reduced in hydrogen at 500° C. The mass ratio of YSZ, LSM, and Ni+Cu+Ce is 2:2:1. The molar ratio of Ni, Cu, and Ce is 1:1:1. The mass percentage of Ni is 4.4%. In this manner the anodic 12 and sacrificial phases 20 may be substantially homogenous.

Figure 2:
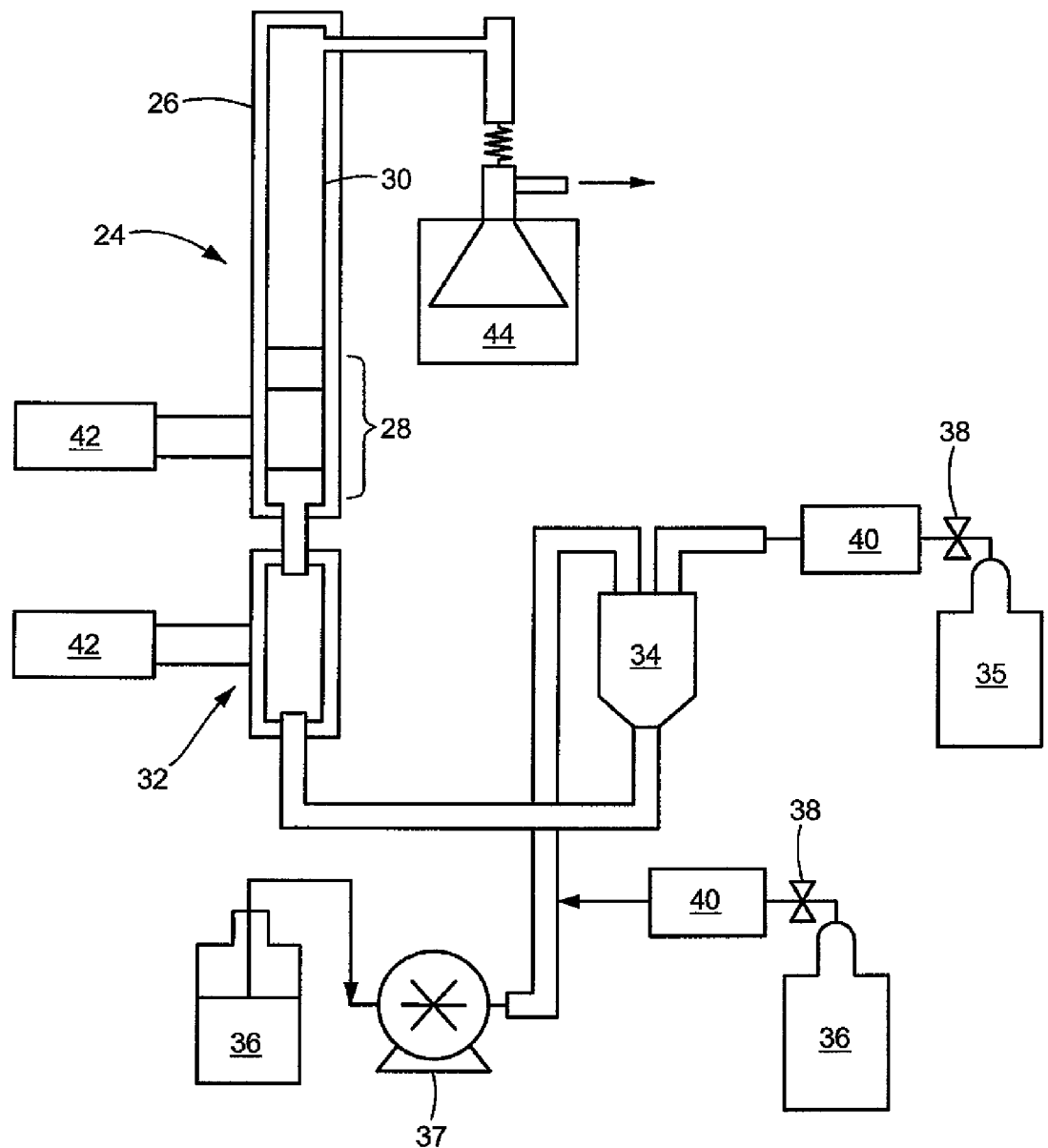
FIG. 2 is a diagram of a catalytic chamber system.

A reforming reactor including the SSEP catalyst is shown in FIG. 2. The main reactor 24 is contained within a 0.5" stainless steel tube 26. The catalyst section 28 is on the lower part. Heat may be imparted to the reactor using a heating tape 30 wrapped around the tube. A preheating section 32 may be optionally installed at the entrance of the reactor. A funnel-shaped fuel/air mixer 34 may be used to uniformly mix air and fuel. Liquid hydrocarbon may be pumped with a metering pump 36. The air stream may be regulated with a back pressure regulator 38 and a flow meter 40.

The catalyst section 28 may be 5 cm long and contain about 10 g of SSEP catalyst. Air and liquid hydrocarbon (n-pentadecane or n-octane) may be fed in and mixed at room temperature. The operating temperature may be controlled using thermocouples and a temperature controller 42.

Once the reactor temperature reaches about 500° C., heating may no longer be necessary. The operating temperature can be maintained by regulating the flow rates of liquid hydrocarbons and air. Once the catalytic reaction is intiated, temperature may increase rapidly. For example in less than 30 seconds, the temperature may reach 650° C. from 25° C. The flow rates of the air and fuel may be adjusted to avoid overheating. Quartz beads may optionally be added to the catalyst section to reduce the activity of the catalysts and thereby reduce heating.

The gas phase products may be hydrogen, carbon monoxide, methane, and oxygen or nitrogen. The data are summarized in Table 3 and Table 4.

The fuel conversion may be evaluated using:

Fuel Conversion=(Converted Fuel)/(Fuel Input)   (10)

The fuel input is the product of the time and the flow rate.

The amount of converted fuel may be evaluated using:

Converted fuel=Fuel input−liquid phase products collected in the ice-cooled condenser   (11)

The hydrogen yield may be evaluated using:

Hydrogen and CO yield=Total mol amount of $H_2$ and CO produced per unit of C/Maximum production at specific condition.   (12)

Tables 3 and 4 give the concentrations of the major gas phase products from reforming n-octane and n-pentadecane respectively. The fuel conversion is very high and essentially does not depend on temperature in a range from 450 to 650° C. Hydrogen yield seems to be a function of temperature. The concentration of nitrogen may be referred as the summation of the concentrations of nitrogen and oxygen because the GC is not able to significantly separate oxygen and nitrogen. However, it is believed that the amount of oxygen is minor or negligible.

TABLE 3

Summary of results of reforming n-octane using SSEP catalysts.

| T °C. | $H_2$ vol % | CO vol % | $N_2$ vol % | $CH_4$ vol % | $H_2$ and CO yield | Fuel Conversion |
|---|---|---|---|---|---|---|
| 450 | 16.7 | 14.1 | 67.3 | 1.95 | 88.8% | 95% |
| 550 | 18.9 | 18.1 | 56.4 | 6.5 | 74.0% | 97% |
| 550 | 32.08 | 25.61 | 40.85 | 1.46 | 95.2% | 98% |
| 550 | 16.6 | 16 | 64.3 | 3.1 | 84.0% | 98% |
| 575 | 22.2 | 21.7 | 45.9 | 10.1 | 68.5% | 97% |
| 600 | 19.3 | 18.2 | 57.4 | 5.1 | 78.6% | 98% |
| 650 | 25.6 | 24.8 | 45.5 | 4.2 | 85.7% | 98% |
| 650 | 28.15 | 18.27 | 53.1 | 0.48 | 98.0% | 99% |

TABLE 4

Summary of results of reforming n-pentadecane using SSEP catalysts.

| T °C. | $H_2$ vol % | CO vol % | $N_2$ vol % | $CH_4$ vol % | $H_2$ and CO yield | Fuel Conversion |
|---|---|---|---|---|---|---|
| 450 | 12.5 | 10.12 | 75.98 | 1.4 | 89.0% | 97% |
| 500 | 19.34 | 12.36 | 64.93 | 3.37 | 82.5% | 97% |
| 550 | 20.27 | 12.13 | 67.38 | 0.22 | 98.7% | 98% |
| 650 | 15.4 | 12.5 | 69.6 | 2.5 | 84.8% | 98% |

The average surface area was about 10 m²/g. This indicates that the catalysts do not have a particularly high surface area. The residence time for the reactants was about 100 ms, indicating that the catalytic PDX reforming was a fast response reaction.

In order to compare the SSEP catalysts with other catalysts, the catalysts that were tested at temperatures lower than 550° C. are listed in Table 5. The data for fuel conversion and hydrogen yield are calculated using the same definitions given by Eqs. 3-5. As listed in Table 5, at 450° C., the SSEP catalysts have a superior performance which is not comparable by the other catalysts.

TABLE 5

Summary of experimental data for reforming at temperatures between 450-550° C.

| Temp °C. | Fuel | Method | Catalyst | Fuel conversion | Hydrogen and CO yield |
|---|---|---|---|---|---|
| 450 | heptanes | POX | Rh/γ-$Al_2O_3$ | 70% | 36% |
| 450 | n-octane | POX | SSEP | 95% | 88.8% |
| 450 | pentadecane | POX | SSEP | 97% | 89.0% |
| 450 | isooctane | POX | Rh/$Al_2O_3$ | <10% | |
| 500 | pentadecane | POX | SSEP | 97% | 82.5% |
| 550 | dodecane | POX | 2% Ni—($Ce_{0.75}Zr_{0.25}O_2$) | 64% | 25.0% |
| 550 | isooctane | POX | Rh/$Al_2O_3$ | 30% | |
| 550 | n-octane | POX | SSEP | 97% | 94.6% |
| 550 | pentadecane | POX | SSEP | 97% | 98.2% |

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A self sustaining catalyst comprising;
   10 wt % $Zr_2O_3/Y_2O_3/CeO_2$ ion conductive support, the weight ratio of $Zr_2O_3:Y_2O_3:CeO_2$ being 2:1:8;
   50 wt % $(La_{0.7}Sr_{0.3})Cu_{0.1}Mn_{0.9}O_3$ dispersed cathodic phase;
   30 wt % $(La_{0.75}Be_{0.25})_{0.9}Cr_{0.5}Mn_{0.5}O_3$ dispersed anodic phase; and
   10 wt % Zn/Mg/Cu dispersed sacrificial phase, the weight ratio of Zn:Mg:Cu being 8:2:8.

2. The self sustaining catalyst of claim 1, wherein the oxidation potential between the anodic phase and the cathodic phase is between −0.5 and 0.5 volts.

3. The self sustaining catalyst of claim 1, wherein the ion conductive support includes graphite.

4. The self sustaining catalyst of claim 1, wherein the catalyst has a surface area of at least 1 $m^2/g$.

5. The self sustaining catalyst of claim 1, wherein the anodic phase comprises dispersed particles about 1 micrometer in diameter or smaller.

6. The self sustaining catalyst of claim 1, wherein the ion conductive support includes poly(styrene-divinylbenzene) and graphite.

\* \* \* \* \*